United States Patent

[11] 3,577,146

[72] Inventors  Michael Freier;
               Leonard P. Balazer, Sunnyvale, Calif.
[21] Appl. No. 817,616
[22] Filed     Apr. 16, 1969
[45] Patented  May 4, 1971
[73] Assignee  The United States of America as represented
               by the Secretary of the Air Force

[54] PASSIVE MONOPULSE RANGING SYSTEM
     3 Claims, 4 Drawing Figs.
[52] U.S. Cl. .................................................. 343/112
[51] Int. Cl. .................................................. G01s 5/14,
                                                              G01s 11/00
[50] Field of Search .......................................... 343/112.3

[56]                References Cited
              UNITED STATES PATENTS
3,134,104  5/1964  Murphree et al. ............ 343/112(.3)
3,430,243  2/1969  Evans ............................ 343/112(.3)

Primary Examiner—Rodney D. Bennett, Jr.
Assistant Examiner—Richard E. Berger
Attorneys—Harry A. Herbert, Jr. and Julian L. Siegel ABSTRACT: A monopulse ranging system where incoming signals from two antennas are converted to an intermediate frequency and passed through corrective delays with one of the delays being controlled by a delay balance discriminator. The detected envelopes of the signals are fed to a differential amplifier, the output thereof being fed to a range computer and the delay balance discriminator detects the differences to be fed back to one of the delay controls.

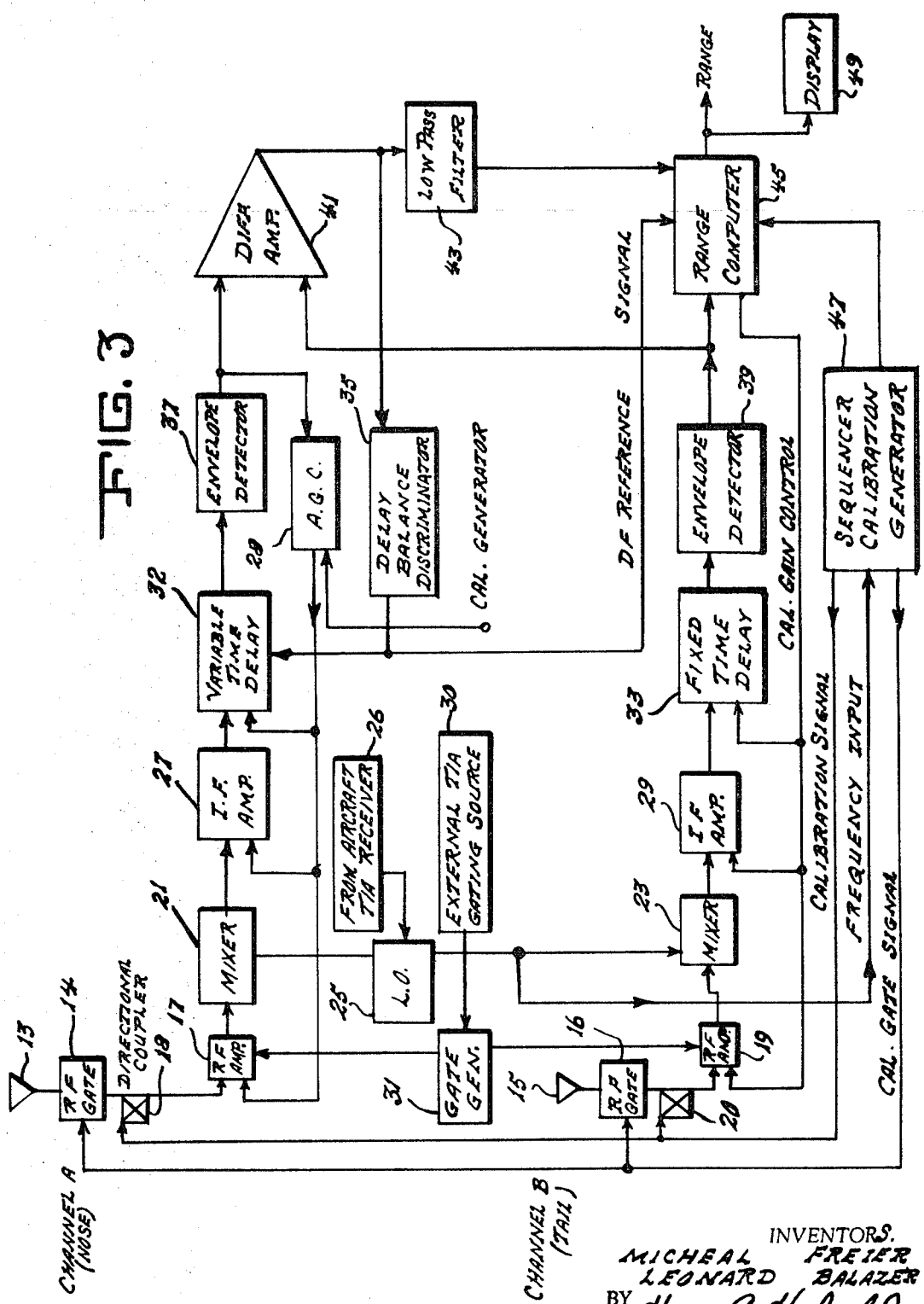

PASSIVE MONOPULSE RANGING SYSTEM

BACKGROUND OF THE INVENTION

This invention relates to range detectors and more particularly to a passive monopulse-ranging system for determining the distance between a vehicle and any electromagnetic radiating source.

Previous passive ranging techniques require more than one data signal sample, such as directional finding together with triangulation, and over a long time period to calculate the range. Some of these techniques are known as vertical triangulation, horizontal triangulation, squint angle, and azimuth/elevation ranging.

This invention makes it possible to passively locate an electromagnetic pulse emitter on the basis of one received pulse. It thus makes a three-dimensional monopulse system practical. Ranging measurements are instantaneous and vehicle perturbations do not directly affect ranging accuracy.

SUMMARY OF THE INVENTION

The monopulse-ranging system of this invention can be used to determine the distance or range from a sensing platform to any electromagnetically radiating emitter, and presents a specific utilization of the monopulse principle in an aircraft to ground radar ranging problem. The sensing platform can be a moving aircraft with one antenna located at the nose and the other at the tail and the emitter can be a ground based pulsed radar.

It is therefore an object of the invention to provide a system for determining the distance between a vehicle and a source of electromagnetic radiation.

It is another object to provide a system for passively locating an electromagnetic pulse emitter on the basis of one received pulse.

It is still another object to provide a ranging measurement system which is instantaneous and in which vehicle perturbation does not affect ranging accuracy.

These and other advantages, features and objects of the invention will become more apparent from the following description taken in connection with the illustrative embodiment in the accompanying drawings, wherein:

DESCRIPTION OF THE DRAWINGS

FIG. 3 is a block diagram showing the monopulse-ranging system; and

DETAILED DESCRIPTION OF THE PREFERRED EMBODIMENT

Figure 1:
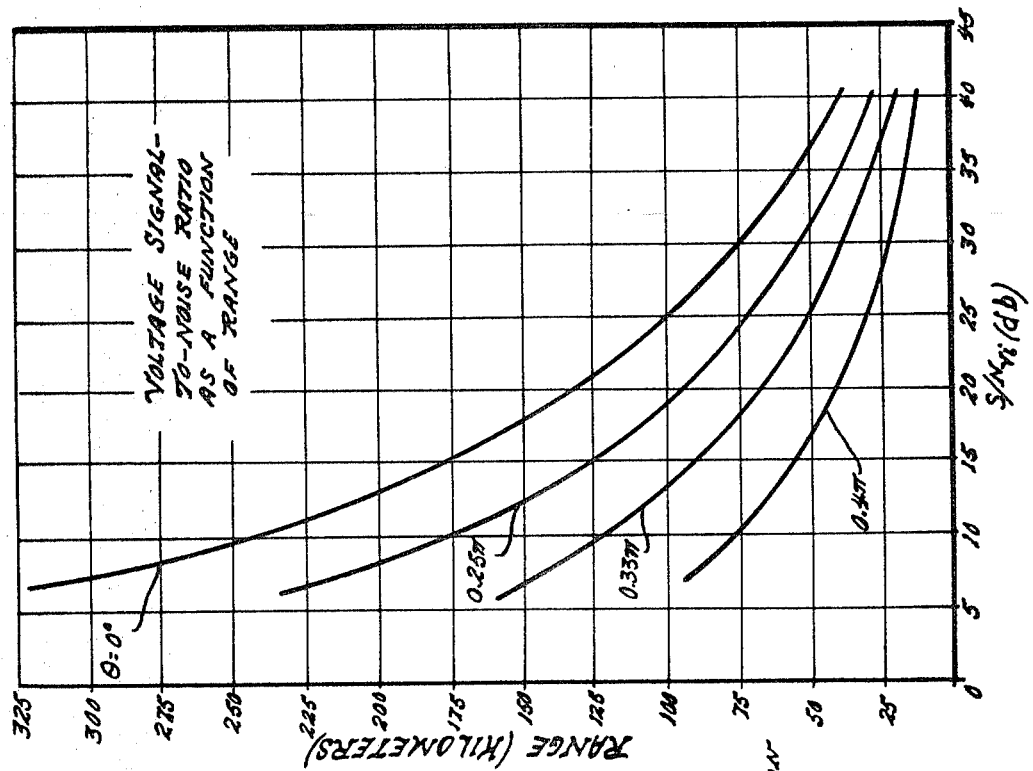
FIG. 1 is a graph showing the signal-to-noise ratio plotted against range for various angles to the emitter.

The present invention enables the operator of a device that can be located in an airborne vehicle to determine the range of the vehicle to any electromagnetic emitter within its detection range. Ranging is done passively and can be accomplished on the reception of a single pulse, hence, monopulse ranging.

The power received by an antenna from a transmitter is expressed by the one-way radar range equation $$P_R = P_T G_T G_R \left(\frac{\lambda}{4\pi R}\right)^2$$

where
$P_R$ = Power received
$P_T$ = Power transmitted
$G_R$ = Receiver antenna gain, max.
$G_T$ = Transmitters antenna gain, max.
$\lambda$ = Wavelength
$R$ = Range.

All of the above parameters except $R$ and $P_R$ can be assumed to remain constant during the short period of a range measurement; therefore, received power can be related to $R$ by $$P_R = \frac{K}{R^2}$$

where $$K = P_T G_T G_R \left(\frac{\lambda}{4\pi}\right)^2$$

The first derivative of received power relative to range can be obtained by differentiating the above expression for $P_R$ to obtain $$\frac{dP_R}{dR} = \frac{-2K}{R^3} = \frac{\Delta P}{\Delta R} = \frac{2P_R}{R}$$

$$\Delta P_R = \frac{dP_R}{dR} \Delta R = \frac{2P_R}{R} \cdot \Delta R$$

This quantity could be obtained by comparing a single radar pulse received at two locations which are a known radial distance apart. By dividing the total power received by one antenna by the first derivative, the measurement can be normalized and made independent of $K$.

$$\frac{P_R}{\frac{\Delta P}{\Delta R}} = \frac{\frac{K}{R^2}}{\frac{-2K}{R^3}} = \frac{-R}{2}$$

The negative sign may be eliminated by considering $R = R_1 - R_2$ to be negative. Accordingly, $$R = \frac{2 P_R}{\frac{\Delta P_R}{\Delta R}}$$

To solve this equation it is not necessary to know anything about the transmitter characteristics. However, $\Delta P$ is a small quantity and thermal receiver noise and the receiver noise factor are significant in relation to $\Delta P$.

Receiver noise and multipath propagation error are possible sources of error in this method of ranging. Multipath error effects will vary with range and terrain irregularity while receiver noise can be considered constant. Receiving system absolute calibration error is largely canceled since $\Delta P_R$ and $P_R$ can be measured simultaneously by much the same equipment. Calibration error cancelation can be illustrated by rewriting the first derivative range equation with error factors and assuming $P_R$ and $\Delta P_R$ measurements are made by the same equipment. The calibration error factor is designated as $E_P$, such that measured power equals actual power times $(1+E_P)$ $$R = \frac{2\Delta R P_R}{\Delta P_R} = \frac{2\Delta R P_R (1+E_P)}{P_{R1}(1+E_P) - P_{R2}(1+E_P)}$$

It can be seen that the $(1+E_P)$ factor cancels such the range measurement is independent of calibration error. Since $P_{R1}$ and $P_{R2}$ are very nearly the same level, receiver linearity errors are negligible. $P_R$ is more correctly $$\frac{P_{R1} + P_{R2}}{2}$$

however, the difference between $P_R$ and $P_{R1}$ or $_{R2}$ amounts to one part in 4,000, and consequently the error due to using $P_{R1}$ or $P_{R2}$ for $P_R$ is negligible.

To indicate the ranging accuracy which can be achieved by this invention, signal-to-noise ratio can be calculated for a worst case search radar; as an example, one located 100 km. from a ranging aircraft with the receiving antennas set 25 meters apart.

It is assumed that the radar transmits 750 kw. peak power, $G_T$ is 40 db., $G_R$ is 6 db. and $\lambda$ is 0.107 m., corresponding to 2.8 GHz. Then, $K = 2.16 \times 10^6$ W-M².

Signal-to-noise voltage ratio, $\Delta V_R/V_N$, in a system incorporating linear signal detection, is calculated by solving a signal voltage range equation derived from the power range equation. To derive this equation, consider that $V_R \sim \sqrt{P_R}$ where $V_R$ is receiver signal voltage. Since $$P_R = K/R^2$$

then $$V_R = \sqrt{K/R}$$

Differentiating $V_R$ with respect to R, $$dV_R = -\frac{\sqrt{K}}{R^2}dR$$

Since $$\frac{dV_R}{dR} \simeq \frac{\Delta V_R}{\Delta R}$$

therefore, $$\Delta V_R = \frac{(2.16 \times 10^6)^{\frac{1}{2}} W - M^2}{10^{10} M^2} 25. M = 3.68 \times 10^{-6} V$$

Thermal noise voltage $V_N$ at an operating temperature of 290° K, 20 MHz bandwidth and receiver noise factor, F=3.16, is 5.02 ×10$^{17}$ V. This value cannot be used directly since when two uncorrelated random noise signals are compared, the total r.m.s. noise voltage, $V_{NT}$, is calculated by $$V_{NT} = (V_{N1}^2 + V_N^2)^{1/2}$$

where $V_{N1}$ and $V_{N2}$ are the noise voltages of the separate signals.
If $$V_{N1} = V_{N2}, \quad V_{NT} = \sqrt{2V_{N1}}$$

Therefore, difference noise voltage is $V_{NT} = 2 \times 5.02 \times 10^{17} = 7.1 \times 10^{17}$ volts, and single pulse voltage signal to noise is $$= \frac{3.68 \times 10^{-6}}{7.10 \times 10^{-7}} = 5.17 = 14.3 \text{ db}$$

This is the ratio of the difference signal voltage to total noise voltage.

In the operational situation an aircraft will always receive a pulse train rather than a single pulse. The least number of pulses in a pulse train can be calculated by considering pulse rate, scan rate, and beam width of a worst case search radar with a beam width of 1°, a 3 rp.m. scan rate, and a pulse rate of 360 pps. The number of pulses, N, intercepted by the aircraft would be $$N = \frac{1°}{360°} \cdot \frac{60 \text{ sec./min.}}{3/\text{min.}} \cdot \frac{360 \text{ pulses}}{\text{sec.}} = 20 \text{ pulses}$$

the power signal to noise improvement, $G_P$, that can be gained by pulse integration is $G_P = N\lambda$ where $\lambda$ is 0.8 for 20 pulses.

Since voltage signal to noise is equal to the square root of power signal to noise, voltage signal to noise gain, $G_V$, is $$G = \sqrt{G_P} = N^{0.5} = 20^{0.4} = 3.31 = 10.4 \text{ db}.$$

Therefore, the integrated voltage signal to noise at 100 km. is $$S/N_{V_T} = 3.31 \times 5.17 = 17.1 = 24.7 \text{ db}.$$

Figure 2:
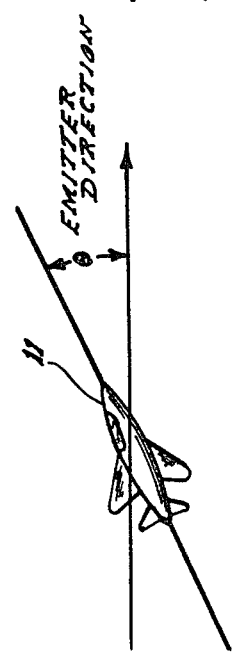
FIG. 2 is a diagram of a vehicle showing the angular variation.

Fig. 1 shows range in relation to signal to noise. This information is given for four different aircraft bearing angles, $\theta$ to emitter direction. Since the difference signal strength is approximately proportional to the difference in radial distance of the two antennas from the transmitter, signal strength is proportional to cos $\theta$ and decreases as the aircraft heading deviates from the emitter bearing as shown in FIG. 2 where $\theta$ is the angle of the vehicle 11 in relation to the target.

The operation of the invention is explained referring to the block diagram of FIG. 3 which shows two incoming signals and two channels. Channel A is derived from the nose of the vehicle and Channel B from the tail of the vehicle. Incoming signals from antennas 13 and 15 first pass through RF gates 14 and 16 and directional couplers 18 and 20 and then to RF amplifiers 17 and 19. After amplification the signals are mixed in mixers 21 and 23 with the signal from local oscillator 25 to produce intermediate frequency signals. The frequency of the local oscillator signal is locked by an AFC link control 26 such as the target identification and acquisition (TIA) unit which is independent of the ranging system. The ranging frequency is adjusted simultaneously by the same means and is fed to calibration generator 47. The incoming signal channel is also gated by a TIA supplied gating signal from control 30 to gate generator 32 in order to pass only the pulse train of interest through RF amplifiers 17 and 19. The TIA supplied signals enable the ranging system to select one emitter in an interleaved pulse train. Without the TIA or similar control, this capability would have to be supplied with additional equipment. After leaving mixers 21 and 23, IF signals are amplified by IF amplifiers 27 and 29 through time delay networks 31 and 3. This delay compensates for the time required by the incident wave to traverse the distance in radial difference between the two antennas. In an aircraft installation, this time will be proportional to the aircraft heading relative to the emitter direction and will vary according to $D = D_M \cos \theta$.

Where D is the delay time, $D_M$ is the maximum delay when the angle, $\theta$ between the aircraft heading and target direction is zero. The channel B time delay is fixed, but adjustable during ground alignment and checkout. The channel A time delay is variable and the delay time is determined by a DC voltage level from delay balance discriminator 35. The maximum differential delay corresponds to the time for an electromagnetic wave to traverse the distance between antennas or 83 ns, corresponding to 25 m. in this case of the example used.

Since the ranging system is designed to operate at all headings relative to target direction, channel A delay must vary over a range from 83 ns. less than channel B to 83 ns. more than channel B. To accomplish this, channel B is set at a nominal 100 ns. at checkout and alignment, and channel A varies from zero to 200 ns. After passing through the delay networks, the incoming signals are envelope detected by detectors 37 and 39 and fed into differential amplifier 41.

Figure 4:
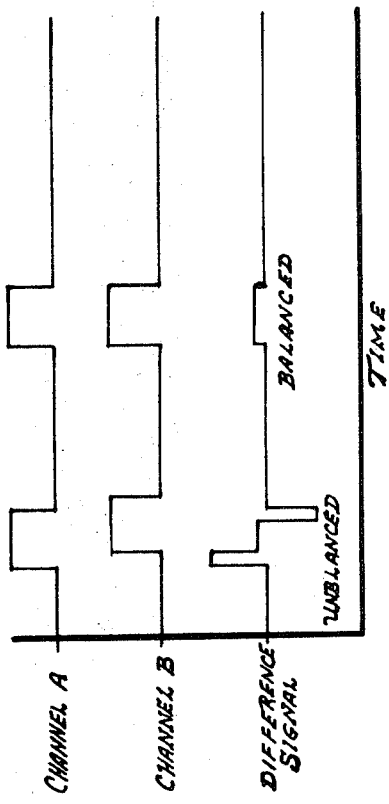
FIG. 4 shows the output waveforms of the differential amplifier.

If the two differential amplifier input signals are not synchronous, large amplitude outputs will occur during the time in which the signals do not overlap, as shown in FIG. 4. If the channel A signal leads the channel B signal, the difference signal will be equal to the value of the channel A signal alone until the channel B signal arrives. This will cause a high amplitude positive excursion at the beginning of the output pulse waveform. When both signals are present, the output will consist of a relatively low amplitude difference signal and this will be followed by a high amplitude negative excursion when the channel A pulse has passed through the amplifier and the channel B signal is still present. If the channel B signal led the channel A signal, this sequence would be reversed and the output waveform would consist of a high amplitude negative excursion followed by the difference signal and then by a high amplitude positive excursion.

The presence and sequence of these high amplitude excursions at the beginning and end of the difference pulse waveform is detected by delay balance discriminator 35. A proportional control voltage is generated and fed back to variable time delay 32 to automatically equalize the time of appearance of the two signals at the output of the respective channel. The polarity of the control voltage determines the sense of the feedback signal and minimizes the output of differential amplifier 41. This reduces the high amplitude excursions to no more than a spike at the beginning and end of the pulse waveform.

The signal from differential amplifier 41 is next passed through low pass filter 43 to eliminate the spikes due to residual delay imbalance and then fed to range computer 45.

An example of a range computer that can be used in the present invention is disclose in our copending application, filed herewith.

The channel B configuration is the same as channel A with the exception that the delay is fixed except during alignment and the channel gain is controlled by feedback from range computer 45 to RF amplifier 19.

Inflight calibration of the monopulse ranging system balances the gain response of both channels. RF signals of equal amplitude are inserted into both signal channels, channel A from automatic gain control 28 and channel B from range computer 45. Channel B is automatically adjusted to obtain a null difference signal output. The calibration signal is *cw* so that time delays are not involved. The system is calibrated before each range measurement as soon as the transmitted frequency is determined and gated by the TIA equipment or other control and the receivers and calibration generator 47 are tuned to this frequency. The calibration signal is inserted into directional couplers 18 and 20 at the receiver input at a level equal to a signal level while incoming signals are excluded by input gates 14 and 16. During calibration and during range measurement the gain of channel A is clamped at the level reached while receiving the input signal during the TIA cycle The gain of channel B is next adjusted to obtain a null in the difference signal input into range computer 45 while the calibration signal is inserted into the system. Both channel gains remain set at this level during the range measurement of the particular emitter. This process is repeated before each range determination. The range can be read out by display 49.

We claim:

1. A monopulse-ranging system comprising:
   a. first and second means spaced a predetermined distance for receiving a signal;
   b. a local oscillator;
   c. a first mixer fed by the local oscillator and the first signal-receiving means;
   d. a variable time delay fed by the first mixer;
   e. a first envelope detector fed by the variable time delay;
   f. a second mixer fed by the local oscillator and the second signal-receiving means;
   g. a second time delay fed by the second mixer;
   h. a second envelope detector;
   i. a differential amplifier fed by the first and second envelope detectors;
   j. a delay balance discriminator fed by the differential amplifier and connected to the variable delay for the control thereof;
   k. a low pass filter fed by the differential amplifier; and
   l. means for computing the range fed by the output of the low pass filter, a reference signal from the delay balance discriminator, and the second envelope detector.

2. A monopulse-ranging system according to claim 1 which further comprises:
   a. first and second gated amplifiers interposed between the first and second signal-receiving means and the first and second mixers respectively; and
   b. means for gating the first and second gated amplifiers.

3. A monopulse-ranging system according to claim 2 which further comprises:
   a. first and second RF gates;
   b. first and second directional couplers fed respectively by the first and second RF gates, the RF gate-directional coupler combinations being interposed one each between the signal-receiving means and the gated amplifiers; and
   c. a calibration generator having an external frequency input source, the output of the calibration generator being fed to the first and second RF gates and the first and second directional couplers.